United States Patent
Yamamoto et al.

(10) Patent No.: US 11,512,763 B2
(45) Date of Patent: Nov. 29, 2022

(54) BELT-TYPE CONTINUOUSLY VARIABLE TRANSMISSION

(71) Applicant: TOYOTA JIDOSHA KABUSHIKI KAISHA, Toyota (JP)

(72) Inventors: Kozo Yamamoto, Nagoya (JP); Keisuke Ninomiya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 17/023,960

(22) Filed: Sep. 17, 2020

(65) Prior Publication Data

US 2021/0131534 A1    May 6, 2021

(30) Foreign Application Priority Data

Nov. 5, 2019   (JP) .............................. JP2019-200943

(51) Int. Cl.
    *F16H 9/12*          (2006.01)
    *F16H 57/035*      (2012.01)

(52) U.S. Cl.
    CPC ............. *F16H 9/12* (2013.01); *F16H 57/035* (2013.01)

(58) Field of Classification Search
    CPC ...... F16H 57/035; F16H 57/0489; F16H 9/12; F16H 9/125
    See application file for complete search history.

(56) References Cited

U.S. PATENT DOCUMENTS

| | | | | |
|---|---|---|---|---|
| 6,938,508 | B1 * | 9/2005 | Saagge | F16H 57/0489 474/93 |
| 7,427,248 | B2 * | 9/2008 | Chonan | F16H 57/0415 474/93 |
| 2011/0183792 | A1 * | 7/2011 | Yagasaki | F16H 57/0456 474/43 |
| 2015/0308560 | A1 * | 10/2015 | Itoo | F16H 57/0489 474/146 |
| 2017/0276234 | A1 * | 9/2017 | Kuji | F16H 57/0489 |
| 2019/0285160 | A1 * | 9/2019 | Nelson | F28F 9/22 |

FOREIGN PATENT DOCUMENTS

| | | | | |
|---|---|---|---|---|
| EP | 1162390 A1 * | 12/2001 | | F16H 57/0456 |
| JP | 2005-282695 A | 10/2005 | | |
| JP | 2018-505358 A | 2/2018 | | |
| JP | 2019-019886 A | 2/2019 | | |
| WO | 2016107680 A1 | 7/2016 | | |
| WO | WO-2016107680 A1 * | 7/2016 | | F16H 55/56 |

* cited by examiner

*Primary Examiner* — Daniel D Yabut
(74) *Attorney, Agent, or Firm* — Oliff PLC

(57) ABSTRACT

A belt-type continuously variable transmission includes: a primary pulley; a secondary pulley; a belt wound along the primary pulley and the secondary pulley; and a casing accommodating the primary pulley and the secondary pulley. Further, the belt has, in a portion being wound along the secondary pulley, a radially outside end which may be located further radially outside than an outer circumference portion of the secondary pulley, and a distance from a rotation center of the secondary pulley to an internal surface of the casing in a first direction, which is along a straight line passing through rotation centers of the primary pulley and the secondary pulley, is shorter than a distance from the rotation center of the secondary pulley to the internal surface of the casing in a second direction which is orthogonal to the first direction at the rotation center of the secondary pulley.

3 Claims, 7 Drawing Sheets

BELT-TYPE CONTINUOUSLY VARIABLE TRANSMISSION

CROSS-REFERENCE TO RELATED APPLICATION(S)

The present application claims priority to and incorporates by reference the entire contents of Japanese Patent Application No. 2019-200943 filed in Japan on Nov. 5, 2019.

BACKGROUND

The present disclosure relates to a belt-type continuously variable transmission.

Japanese Laid-open Patent Publication No. 2005-282695 discloses a belt-type continuously variable transmission including a drive-side primary pulley, a driven-side secondary pulley, an endless belt, and a casing accommodating the primary pulley and the secondary pulley, in which a guide rail for guiding the belt is provided in the casing and chord vibration of the belt is prevented by the guide rail. In the configuration described in Japanese Laid-open Patent Publication No. 2005-282695, since vibration and noise in the casing, resulting from chord vibration of the belt, can be prevented, it is possible to reduce the thickness of the casing and hence to reduce the weight of the casing.

SUMMARY

There is a need for providing a belt-type continuously variable transmission that can prevent an increase in the size of a casing while the internal surface of the casing is located in a position where the internal surface is not in contact with a radially outside end of the belt.

According to an embodiment, a belt-type continuously variable transmission includes: a primary pulley; a secondary pulley; a belt wound along the primary pulley and the secondary pulley; and a casing accommodating the primary pulley and the secondary pulley. Further, the belt has, in a portion being wound along the secondary pulley, a radially outside end which may be located further radially outside than an outer circumference portion of the secondary pulley, and a distance from a rotation center of the secondary pulley to an internal surface of the casing in a first direction, which is along a straight line passing through a rotation center of the primary pulley and the rotation center of the secondary pulley, is shorter than a distance from the rotation center of the secondary pulley to the internal surface of the casing in a second direction which is orthogonal to the first direction at the rotation center of the secondary pulley.

DETAILED DESCRIPTION

In a belt-type continuously variable transmission, it is desired to enlarge a gear ratio range from the minimum gear ratio to the maximum gear ratio. In order to enlarge this gear ratio range, it is conceivable to increase the radius of the belt wound along the secondary pulley and increase the maximum gear ratio. For example, it is conceivable that, by radially outwardly extending the position where the belt can be wound along the winding groove of the secondary pulley, the radius of the belt wound along the secondary pulley can be increased without changing the outside diameter of the secondary pulley. In this case, a part of the belt (radially outside end) may be located further radially outside than the outer circumference portion of the secondary pulley. Therefore, the casing disposed on the outer-circumference side of the secondary pulley would be located such that the internal surface of the casing is not in contact with a radially outside end of the belt.

However, if the internal surface of the casing is disposed in a radial position away from the outer circumference portion of the secondary pulley more than necessary, the size of the casing would increase. Moreover, if the entire internal surface of the casing of the portion covering the outer circumference portion of the secondary pulley is disposed in a radial position equidistant from the outer circumference portion of the secondary pulley, that is, if the internal surface is formed in a perfect circular shape that follows the outer circumference portion of the secondary pulley, an extra radial gap would be created between a radially outside end of the belt and the internal surface of the casing, which may lead to an increase in the size of the casing.

Referring to the accompanied drawings, a belt-type continuously variable transmission according to an embodiment of the present disclosure will be described in detail below. Note that the present disclosure is not limited to the embodiments described below.

Figure 1:
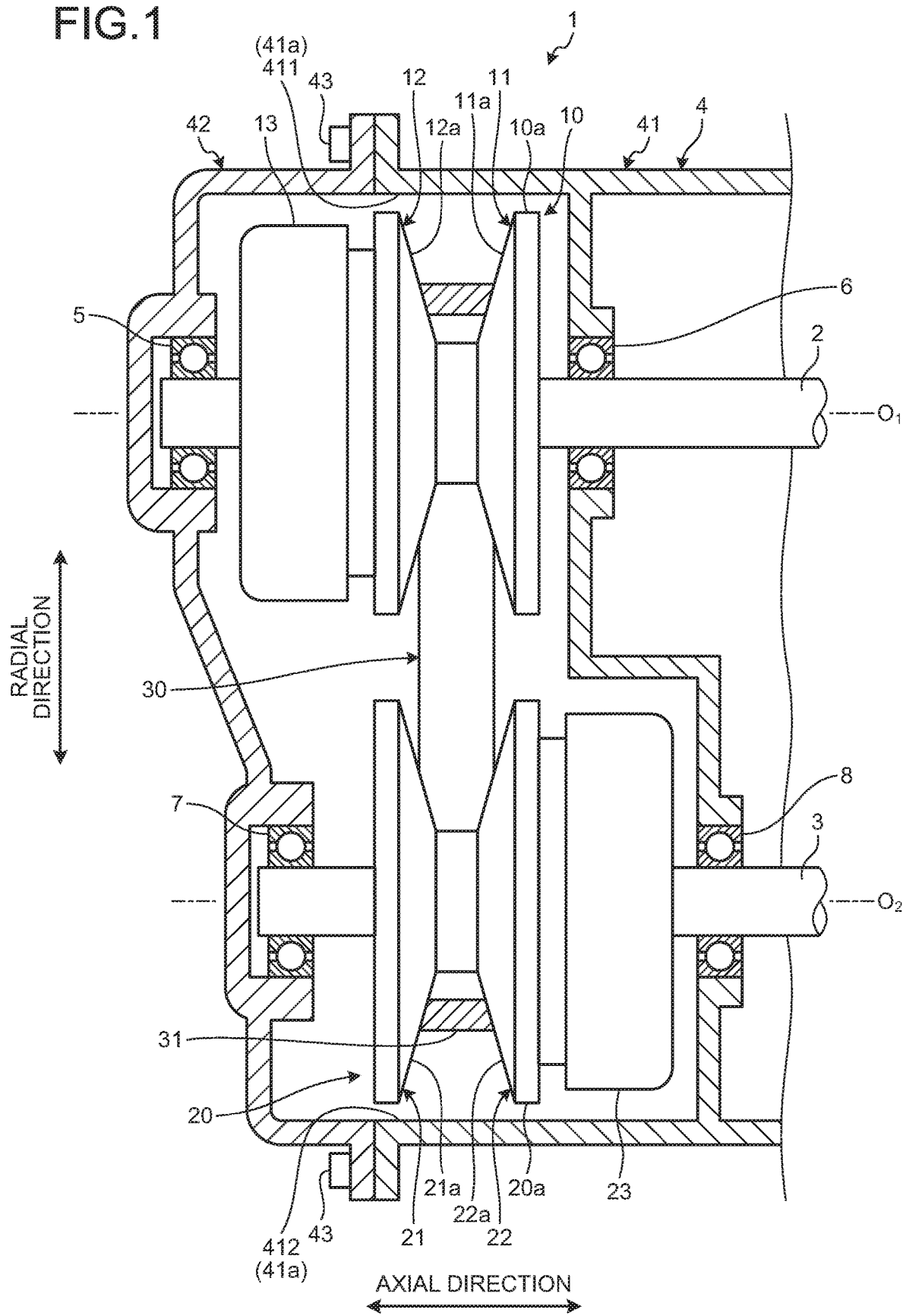
FIG. 1 is a schematic view schematically illustrating a belt-type continuously variable transmission according to an embodiment.

FIG. 1 is a schematic diagram schematically illustrating a belt-type continuously variable transmission according to an embodiment. The belt-type continuously variable transmission 1 includes an input shaft 2, a primary pulley 10, an output shaft 3, a secondary pulley 20, a belt 30, and a casing 4.

The input shaft 2 is a rotary shaft (primary shaft) that rotates integrally with the primary pulley 10. The rotation center of the primary pulley 10 is located on the rotation center axis $O_1$ of the input shaft 2. That is, since the rotation center axis of the primary pulley 10 coincides with the rotation center axis $O_1$ of the input shaft 2, the rotation center of the primary pulley 10 and the rotation center of the input shaft 2 are located at the same position on the plane orthogonal to the rotation center axis $O_1$. The input shaft 2 is rotatably supported by bearings 5 and 6 with respect to the casing 4. The bearings 5 and 6 are a pair of bearings arranged on both axial sides of the primary pulley 10.

The output shaft 3 is a rotary shaft (secondary shaft) that is disposed in parallel with the input shaft 2 and rotates integrally with the secondary pulley 20. The rotation center of the secondary pulley 20 is located on the rotation center axis $O_2$ of the output shaft 3. That is, since the rotation center axis of the secondary pulley 20 coincides with the rotation center axis $O_2$ of the output shaft 3, the rotation center of the secondary pulley 20 and the rotation center of the output shaft 3 are located at the same position on the plane orthogonal to the rotation center axis $O_2$. The output shaft 3 is rotatably supported by bearings 7 and 8 with respect to the casing 4. The bearings 7 and 8 are a pair of bearings arranged on both axial sides of the secondary pulley 20.

The primary pulley 10 is a drive-side pulley. The primary pulley 10 includes a fixed sheave 11 fixed to the input shaft 2, a movable sheave 12 that is able to relatively move on the input shaft 2 in the axial direction, and a hydraulic chamber 13 that applies a thrust to the movable sheave 12. The movable sheave 12 is spline-fitted to the input shaft 2 and rotates integrally with the input shaft 2. A sheave surface 11a of the fixed sheave 11 and a sheave surface 12a of the movable sheave 12 form a belt winding groove (hereinafter, referred to as a V groove) for the primary pulley 10. The outside diameters of the fixed sheave 11 and the movable sheave 12 are formed to be equal. Since the outside diameters of the outer circumference portion of the fixed sheave 11 and the outer circumference portion of the movable sheave 12 are equal, the fixed sheave 11 and the movable sheave 12 are not distinguished from each other in this description and are referred to as an outer circumference portions 10a of the primary pulley 10. The hydraulic chamber 13 is disposed on the rear-surface side of the movable sheave 12 and generates a force (thrust) that pushes the movable sheave 12 toward the fixed sheave 11 in the axial direction with hydraulic pressure. The thrust moves the movable sheave 12 in the axial direction to change the width of the V groove of the primary pulley 10.

The secondary pulley 20 is a driven-side pulley. The secondary pulley 20 includes, a fixed sheave 21 fixed to the output shaft 3, a movable sheave 22 that can relatively move on the output shaft 3 in the axial direction, and a hydraulic chamber 23 that applies a thrust to the movable sheave 22. The movable sheave 22 is spline-fitted to the output shaft 3 and rotates integrally with the output shaft 3. A sheave surface 21a of the fixed sheave 21 and a sheave surface 22a of the movable sheave 22 form a V groove for the secondary pulley 20. The outside diameters of the fixed sheave 21 and the movable sheave 22 are formed to be equal. Since the outside diameters of the outer circumference portion of the fixed sheave 21 and the outer circumference portion of the movable sheave 22 are equal, the fixed sheave 21 and the movable sheave 22 are not distinguished from each other in this description and are referred to as an outer circumference portions 20a of the secondary pulley 20. The hydraulic chamber 23 is disposed on the rear-surface side of the movable sheave 22 and generates a force (thrust) that pushes the movable sheave 22 toward the fixed sheave 21 in the axial direction with hydraulic pressure. The thrust moves the movable sheave 22 in the axial direction to change the width of the V groove of the secondary pulley 20.

The belt 30 is an annular transmission member wound along the respective V grooves formed in the pulleys 10 and 20. The belt 30 is an endless metal belt, and its belt length is invariable. For example, the belt 30 is composed of a steel belt in which a plurality of steel elements is attached to two metal rings, or a chain belt in which a plurality of metal plates is annularly connected by a plurality of pins. If the belt 30 is the steel belt, both sides of each of the elements are clamped in the respective V grooves of the pulleys 10 and 20, and frictional forces are generated among the sheave surfaces 11a, 12a, 21a, and 22a. If the belt 30 is the chain belt, both ends of each of the pins are clamped in the respective V grooves of the pulleys 10 and 20, and frictional forces are generated among the sheave surfaces 11a, 12a, 21a, and 22a. Thus, the belt 30 used in the belt-type continuously variable transmission 1 may be the steel belt or the chain belt.

In the belt-type continuously variable transmission 1, the respective widths of the V grooves of pulleys 10 and 20 change, thereby continuously changing the ratio between the radius of the belt 30 wound along the primary pulley 10 (hereinafter, referred to as a belt winding diameter) and the radius of the belt 30 wound along the secondary pulley 20 (belt winding diameter). That is, the gear ratio $\gamma$ of the belt-type continuously variable transmission 1 can be continuously changed.

When shift control for changing the gear ratio $\gamma$ of the belt-type continuously variable transmission 1 is executed, a hydraulic pressure in the primary-side hydraulic chamber 13 is controlled in order to change the belt winding diameters of respective pulleys 10 and 20 and also, a hydraulic pressure in the secondary-side hydraulic chamber 23 is controlled in order to control a belt clamping pressure to an appropriate level. The belt clamping pressure is a force with which the belt 30 is clamped from both axial sides by the fixed sheave surfaces 11a, 21a and movable sheave surfaces 12a, 22a of the respective pulleys 10 and 20. By controlling the belt clamping pressure to an appropriate level, the optimum frictional force between the V grooves of respective pulleys 10 and 20 and the belt 30 is generated, and belt tension between the pulleys 10 and 20 is secured. Power gear-changed by the belt-type continuously variable transmission 1 is output from an output gear (not illustrated) that rotates integrally with the output shaft 3.

The belt-type continuously variable transmission 1 can be mounted on a vehicle and function as a power transmission device for transmitting power output from a power source of the vehicle to wheels. For example, the vehicle includes an engine, a torque converter, a forward/backward movement switching mechanism, the belt-type continuously variable transmission 1, a differential gear mechanism, an axle, and wheels. In this case, when the vehicle moves forward, power (torque) that rotates in the direction of rotation for forward movement (forward direction) is transmitted to the input shaft 2 of the belt-type continuously variable transmission 1 by the forward/backward movement switching mechanism. When the vehicle moves backward, the power (torque) that rotates in the direction of rotation for backward movement (backward direction) is transmitted to the input shaft 2 of the belt-type continuously variable transmission 1 by the forward/backward movement switching mechanism. The direction of rotation for forward movement means the direction in which the input shaft 2 rotates when the vehicle equipped with the belt-type continuously variable transmission 1 moves forward. The direction of rotation for backward movement means the direction in which the input shaft 2 rotates when the vehicle equipped with the belt-type continuously variable transmission 1 moves backward. The direction of rotation for backward movement is opposite to the direction of rotation for forward movement.

The casing 4 is a transmission casing that accommodates the primary pulley 10 and the secondary pulley 20. The casing 4 includes a casing member 41, and a cover member 42 that closes an axial opening of the casing member 41. The casing member 41 accommodates most of the respective pulleys 10 and 20, and the cover member 42 accommodates the hydraulic chamber 13 of the primary pulley 10. The casing member 41 and the cover member 42 are fastened and integrated with bolts 43. For example, the mating surface of the casing member 41 and the mating surface of the cover member 42 are bolted while these mating surfaces are kept axially butted against each other. When the belt-type continuously variable transmission 1 is mounted on the vehicle, the cover member 42 functions as a rear cover. In this case, the forward/backward movement switching mechanism and the differential gear mechanism are accommodated in the casing member 41.

In addition, an internal surface 41a of the casing member 41 is formed in a shape that allows covering of the portion where the belt 30 is disposed. In the axial direction, the internal surface 41a extends up to an axial position where the belt 30 can be accommodated. In the radial direction, the internal surface 41a is formed in a range that allows covering of the outer-circumference side of the belt 30. That is, the internal surface 41a is formed to cover portions (circumferential range) of the sheave surfaces 11a, 12a of the primary pulley 10, between which the belt 30 is wound and also, to cover portions (circumferential range) of the sheave surfaces 21a, 22a of the secondary pulley 20, between which the belt 30 is wound.

Figure 2:
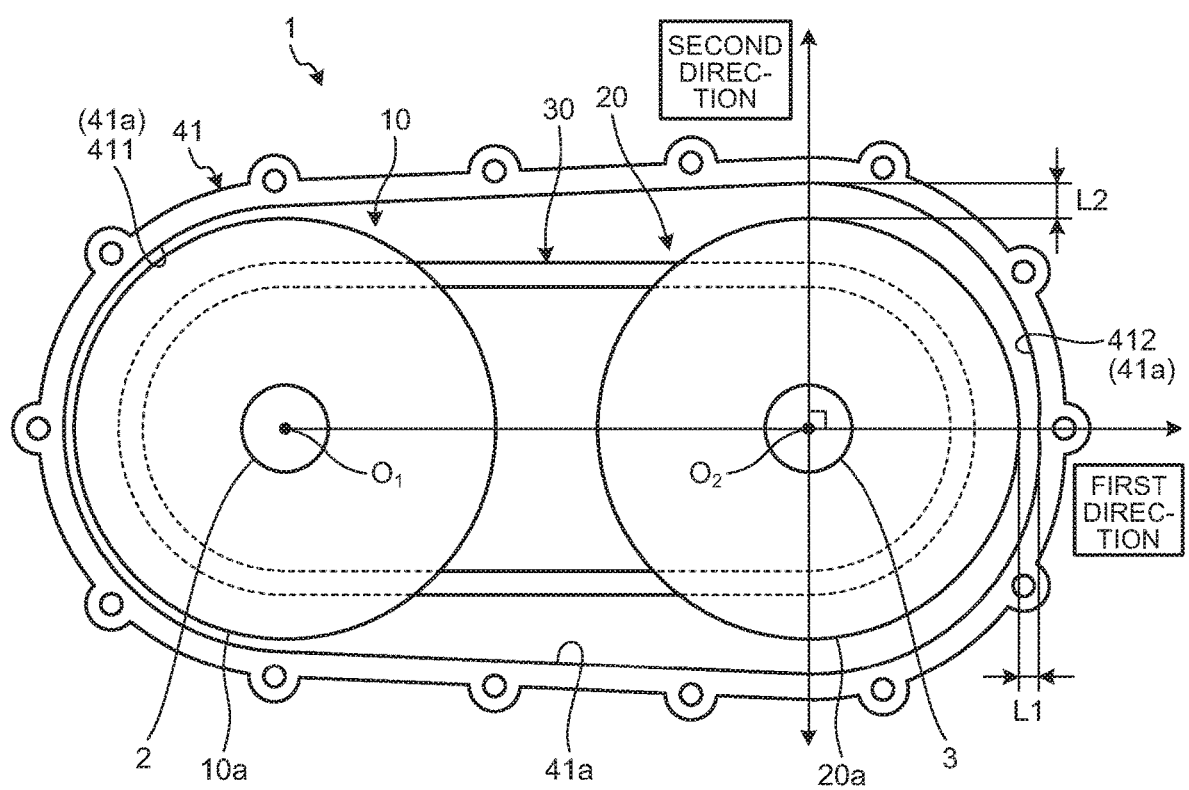
FIG. 2 is a skeleton diagram illustrating a belt-type continuously variable transmission accommodated in a casing member, as seen from an axial direction.

FIG. 2 is a skeleton diagram illustrating the belt-type continuously variable transmission accommodated in the casing member, as viewed from the axial direction. Note that FIG. 2 illustrates a state in which the axial opening and the mating surface of the casing member 41 are visible in a state in which the cover member 42 is removed. In FIG. 2, the hydraulic chamber 13 of the primary pulley 10 is omitted.

As illustrated in FIG. 2, the internal surface 41a of the casing member 41 covers a part of the outer circumference portion 10a of the primary pulley 10 and a part of the outer circumference portion 20a of the secondary pulley 20 so as to entirely cover the outer-circumference side of the belt 30. The internal surface 41a is composed including a first internal surface 411 provided on the outer-circumference side of the primary pulley 10 and a second internal surface 412 provided on the outer-circumference side of the secondary pulley 20.

The first internal surface 411 is formed so as to cover a portion of the primary pulley 10 along which portion the belt 30 is wound (circumferential range corresponding to the biting angle of the belt 30 in the primary pulley 10). In addition, in a radial direction of the primary pulley 10, the first internal surface 411 is disposed near the outer circumference portion 10a of the primary pulley 10. The first internal surface 411 is formed in a perfect circular curved surface that follows the perfect circular outer circumference portion 10a, as viewed from the axial direction of the input shaft 2.

The second internal surface 412 is formed so as to cover a portion of the secondary pulley 20 along which portion the belt 30 is wound (circumferential range corresponding to the biting angle of the belt 30 in the secondary pulley 20). In addition, in a radial direction of the secondary pulley 20, the second internal surface 412 is disposed near the outer circumference portion 20a of the secondary pulley 20. The second internal surface 412 is formed in an elliptic curved surface, as viewed from the axial direction of the output shaft 3. That is, the second internal surface 412 is not formed so as to be radially equidistant from the outer circumference portion 20a at any point of a circumferential range of the secondary pulley 20. For example, the second internal surface 412 is formed in an elliptic shape in which a portion corresponding to a first direction is disposed at a radial position closer to the outer circumference portion 20a of the perfect circular shape than a portion corresponding to a second direction described below.

Thus, the second internal surface 412 is not formed in a shape that follows the outer circumference portion 20a of the perfect circular shape, but is formed in a shape that follows a trajectory (outer-circumference trajectory) drawn by the belt 30 when the pair of pulleys 10 and 20 rotate. Therefore, the second internal surface 412 is formed in such a shape that a radial distance L1 from the outer circumference portion 20a in the first direction is shorter than a radial distance L2 from the outer circumference portion 20a in the second direction.

As illustrated in FIG. 2, the first direction is a direction along a straight line extending from the rotation center of the primary pulley 10 through the rotation center of the secondary pulley 20. The second direction is a direction orthogonal to the first direction. Therefore, on the outer-circumference side of the secondary pulley 20, a radial distance from the rotation center of the secondary pulley 20 to the second internal surface 412 is set such that the distance (radius of the secondary pulley 20+L1) in the first direction is shorter than the distance (radius of the secondary pulley 20+L2) in the second direction orthogonal to the first direction. Furthermore, the second internal surface 412 is formed in a line-symmetrical shape with respect to the straight line along the first direction, that is, a straight line passing through the rotation center of the primary pulley 10 and the rotation center of the secondary pulley 20, on a plane orthogonal to the rotation center axis ($O_2$) of the secondary pulley 20. In short, the second internal surface 412 is not limited to an elliptic shape as long as the internal surface is formed in a shape that follows the trajectory drawn by the belt 30, on the plane orthogonal to the rotation center axis ($O_2$) of the secondary pulley 20. If the second internal surface 412 has an elliptic shape, the straight line along the first direction described above serves as a short axis and a straight line along the second direction described above serves as a long axis.

Here, the trajectory of the belt 30 will be described with reference to FIGS. 3 to 8.

Figure 3:
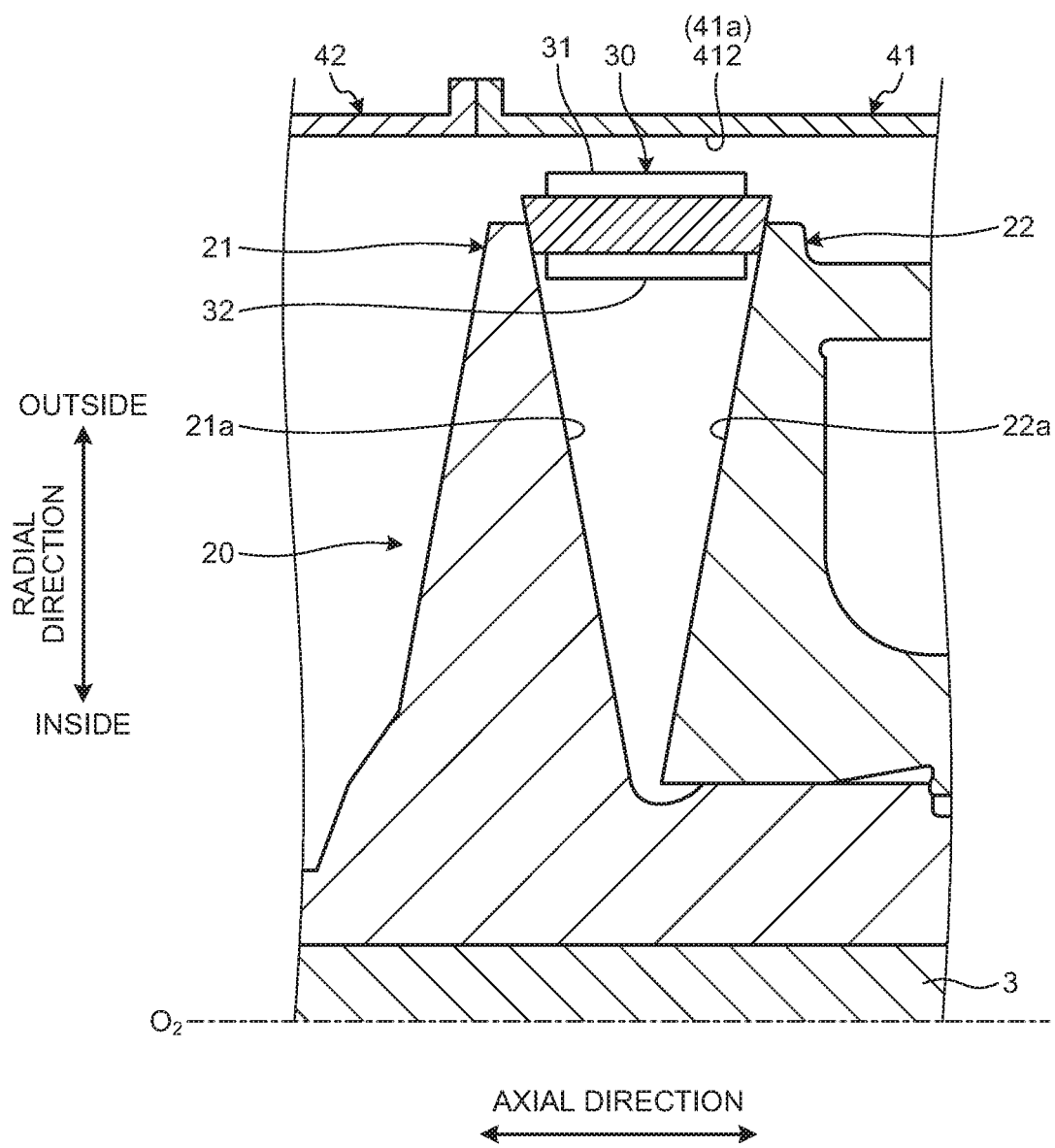
FIG. 3 is a cross-sectional view illustrating a radial position of the belt wound along a V groove of the secondary pulley in a state where a maximum gear ratio is set.

First, referring to FIG. 3, a radial position (belt position) of the belt 30 wound along the V groove of the secondary pulley 20 when the gear ratio γ reaches its maximum value will be described. The belt-type continuously variable transmission 1 is configured such that a part of the belt 30 (radially outside end 31) may be located further radially outside than the outer circumference portion 20a of the secondary pulley 20, as illustrated in FIG. 3, so as to increase the belt winding diameter of the secondary pulley 20.

The belt 30 is an annular transmission member and is formed in an endless shape. Therefore, the belt 30 is composed including a radially outside end 31 forming an annular outer circumference portion, a radially inside end 32 forming an annular inner circumference portion, and both axial edges that are brought into contact with the respective V grooves of the pulleys 10 and 20.

A radially outside end 31 is a portion that relatively composes the outer circumference portion of the belt 30 while the belt 30 is kept wound along (around) the pair of pulleys 10 and 20. A radially inside end 32 is a portion that relatively composes the inner circumference portion of the belt 30 when the belt 30 is kept wound along the pair of pulleys 10 and 20. In a rotating state in which the pair of pulleys 10 and 20 rotates, a trajectory on the outer-circumference side (outer-circumference trajectories 310, 310A, and 310B, described below) is drawn by a radially outside end 31, and a trajectory on the inner-circumference side (inner-circumference trajectories 320, 320A, and 320B) is drawn by a radially inside end 32.

The belt-type continuously variable transmission 1 is configured to increase the belt winding diameter of the secondary pulley 20 and increase the maximum value of the gear ratio γ (maximum gear ratio γ max), in order to enlarge the gear ratio range of the gear ratio γ. Therefore, in a portion of the belt 30 which portion has been wound along the V groove of the secondary pulley 20, if the maximum gear ratio γ max is set, a radially outside end 31 of the belt 30 may be located further radially outside than the outer circumference portion 20a of the secondary pulley 20. For this reason, the second internal surface 412 of the casing member 41 is formed in a shape in which a trajectory drawn by a radially outside end 31 of the belt 30 projecting radially outside from the outer circumference portion 20a of the secondary pulley 20 is taken into account.

The belt 30 illustrated in FIG. 3 is a chain belt. If the maximum gear ratio γ max is set in the case where the belt 30 is a chain belt, a radially outside end of the metal plate, on the secondary pulley 20 side, projects radially outside from the outer circumference portion 20a, with both ends of each of the pins being kept clamped between the sheave surfaces 21a, 22a. Alternatively, in the case where the belt 30 is a steel belt, the top of the element projects radially outside from the outer circumference portion 20a, with both sides of the element being kept clamped between the sheave surfaces 21a, 22a. In short, a radially outside end 31 of the belt 30 is a radially outside end of the metal plate in the case of the chain belt, and is the top of the element in the case of the steel belt. In addition, in the case of the chain belt, respective parts of both ends of the pin may project to radial positions where these ends are not in contact with the sheave surfaces 21a, 22a, that is, to a radially outside position from the outer circumference portion 20a. Similarly, in the case of the steel belt, a part of both ends of the element may project radially outside from the outer circumference portion 20a.

Figure 4:
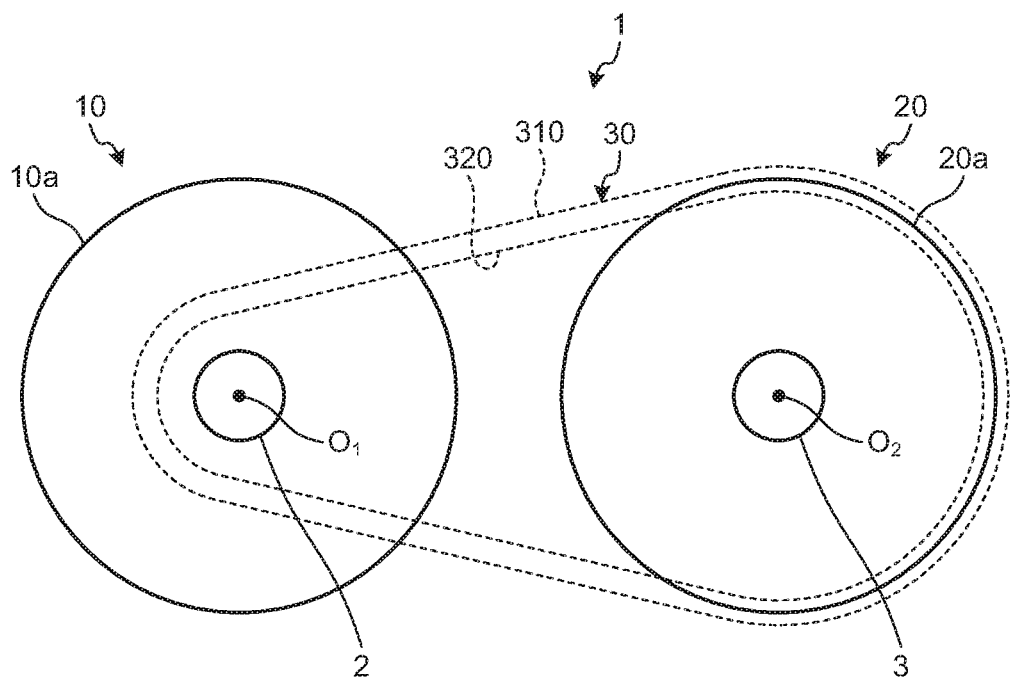
FIG. 4 is a schematic diagram for explaining a trajectory drawn by the belt when a pair of pulleys rotates in a no-loaded state if the maximum gear ratio is set.

FIG. 4 is a diagram for explaining a trajectory drawn by the belt when the pair of pulleys rotates in a no-loaded state if the maximum gear ratio is set. In FIG. 4, the trajectory of the belt 30 is illustrated by a broken line. Also, in FIG. 4, in a no-loaded state, an outer-circumference trajectory 310 drawn by a radially outside end 31 of the belt 30 and an inner-circumference trajectory 320 drawn by a radially inside end 32 of the belt 30 are illustrated by the broken lines. In addition, a belt-entry side of each of the pulleys 10 and 20 is simply referred to as an "entry side". Similarly, the belt exit side of each of the pulleys 10 and 20 is simply referred to as an "exit side".

As illustrated in FIG. 4, when the pair of pulleys 10 and 20 rotates in a no-loaded state if the maximum gear ratio γ max is set, a radially outside end 31 of the belt 30, on the secondary pulley 20 side, entirely projects radially outside along the outer circumference portion 20a of the secondary pulley 20. In a no-loaded state, the belt tension generated between the entry side of the primary pulley 10 and the exit side of the secondary pulley 20 is equal to the belt tension generated between the exit side of the primary pulley 10 and the entry side of the secondary pulley 20. Therefore, at the maximum gear ratio γ max and in a no-loaded state, an amount that a radially outside end 31 projects radially outside from the outer circumference portion 20a is substantially constant in a portion where the belt 30 is wound along the secondary pulley 20. Therefore, the outer-circumference trajectory 310 drawn by a radially outside end 31 has a perfect circular shape following the outer circumference portion 20a in a position further radially outside than the outer circumference portion 20a. That is, the outer-circumference trajectory 310 in a no-loaded state is a trajectory along the outer circumference portion 20a of the secondary pulley 20.

Figure 5:
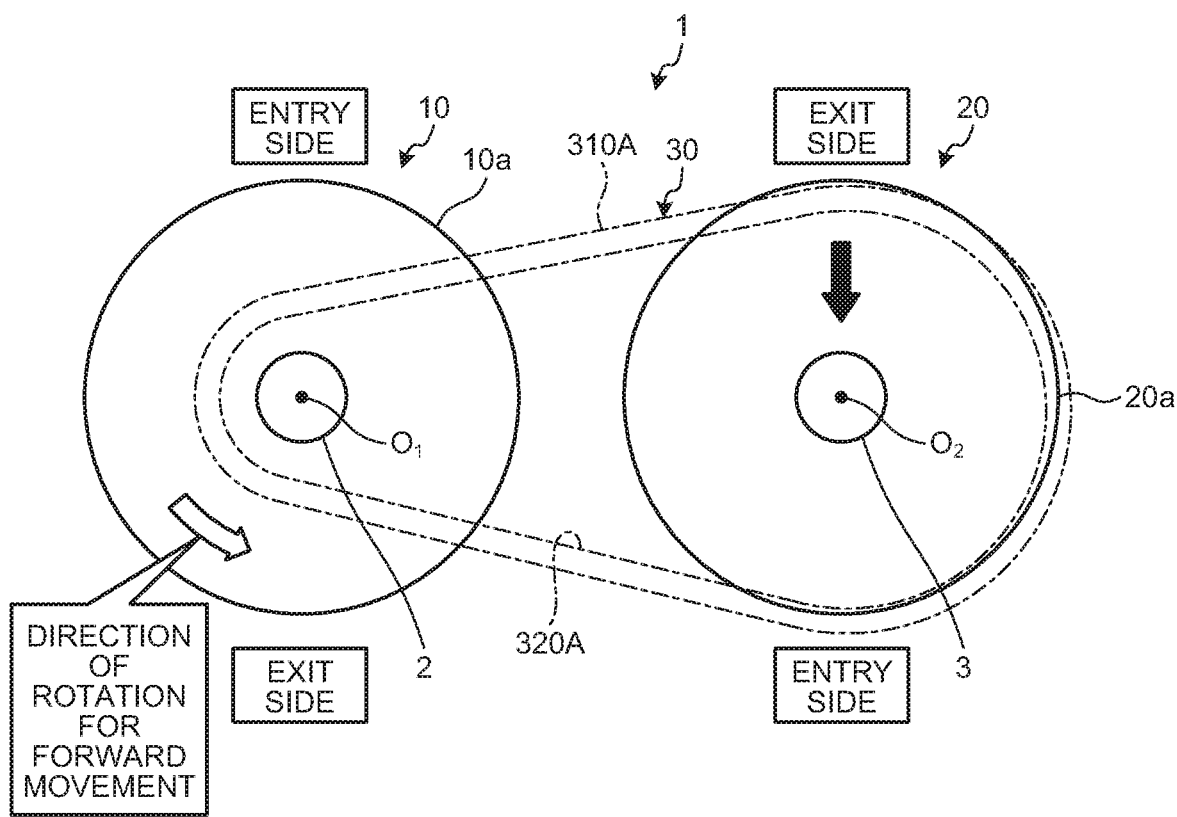
FIG. 5 is a schematic diagram for explaining a trajectory drawn by the belt when the primary pulley rotates in a forward direction in a loaded state if the maximum gear ratio is set.
Figure 6:
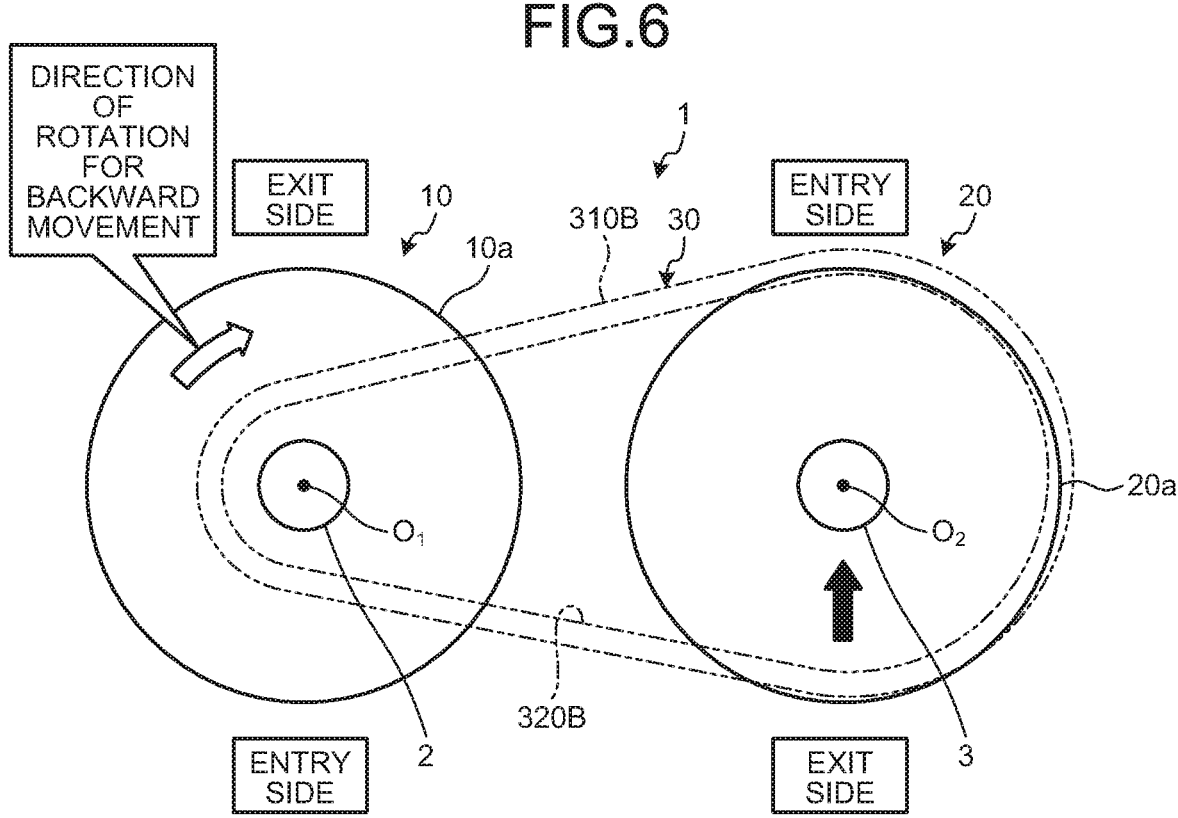
FIG. 6 is a schematic diagram for explaining a trajectory drawn by the belt when the primary pulley rotates in a backward direction in a loaded state if the maximum gear ratio is set.

In addition, the inventors of the present disclosure found out that, in a state in which torque is transmitted from the primary pulley 10 to the secondary pulley 20, that is, in a loaded state, compared with a no-loaded state illustrated in FIG. 4 described above, a trajectory drawn by the belt 30 on the secondary pulley 20 side does not follow the outer circumference portion 20a, as illustrated in FIGS. 5 and 6 that will be described below. Moreover, the inventors of the present disclosure found out that, even when a loaded state is brought about if the maximum gear ratio γ max is set, a trajectory drawn by the belt 30 on the secondary pulley 20 side is made different in shape by a difference in the direction of rotation of the primary pulley 10 between forward movement and backward movement.

FIG. 5 is a schematic diagram for explaining a trajectory drawn by the belt when the primary pulley rotates in the forward direction in a loaded state if the maximum gear ratio is set. FIG. 6 is a schematic diagram for explaining a trajectory drawn by the belt when the primary pulley rotates in the backward direction in a loaded state if the maximum gear ratio is set. The white arrow illustrated in FIG. 5 represents the direction of rotation when the primary pulley 10 rotates in the forward direction. In FIG. 5, the trajectory of the belt 30 is illustrated by a chain line. In addition, the white arrow illustrated in FIG. 6 represents the direction of rotation when the primary pulley 10 rotates in the backward direction. In FIG. 6, the trajectory of the belt 30 is illustrated by the two-dot chain lines.

As illustrated in FIG. 5, when the primary pulley 10 as a drive pulley rotates in the direction of rotation for forward movement in a loaded state if the maximum gear ratio γ max is set, the belt 30, on an exit side of the secondary pulley 20 as a driven pulley, moves toward the radially inside of the secondary pulley 20. In a loaded state, belt tension generated between an entry side of the primary pulley 10 and the exit side of the secondary pulley 20 is greater than belt tension generated between an exit side of the primary pulley 10 and an entry side of the secondary pulley 20. That is, a tension difference occurs. Therefore, in the belt 30, a portion located on the exit side of the secondary pulley 20 is pulled toward the primary pulley 10 more than a portion located on the entry side of the secondary pulley 20, due to the tension difference. As a result, when the primary pulley 10 rotates in the direction of rotation for forward movement, force toward the radially inside of the secondary pulley 20 is applied to the belt 30, as illustrated by the black arrow in FIG. 5, near the exit side of the secondary pulley 20. Since both the secondary pulley 20 and the belt 30 are made of metal, the secondary pulley 20 elastically deforms, and the belt 30 elastically deforms as well. Due to this elastic deformation, the outer-circumference trajectory 310A and inner-circumference trajectory 320A of the secondary pulley 20, which are near the exit side 0, are moved toward the radially inside of the secondary pulley 20, compared with the outer-circumference trajectory 310 and inner-circumference trajectory 320 thereof in a no-loaded state.

As illustrated in FIG. 6, when the primary pulley 10 as a drive pulley rotates in the direction of rotation for backward movement in a loaded state if the maximum gear ratio γ max is set, the belt 30, on an exit side of the secondary pulley 20 as a driven pulley, moves toward the radially inside of the secondary pulley 20. When the primary pulley 10 rotates in the direction of rotation for backward movement, force toward the radially inside of the secondary pulley 20 is applied to the belt 30, as illustrated by the black arrow in FIG. 6, near an exit side of the secondary pulley 20. Therefore, even when the primary pulley 10 rotates in the direction of rotation for backward movement, the outer-circumference trajectory 310B and inner-circumference trajectory 320B of the secondary pulley 20, which are near the exit side, are moved toward the radially inside of the secondary pulley 20 due to the above-described elastic deformation, compared with the outer-circumference trajectory 310 and inner-circumference trajectory 320 thereof in a no-loaded state.

In addition, in a loaded state, the belt 30, on an entry side of the secondary pulley 20, is pushed in a running direction by the force acting from an exit side of the primary pulley 10. Therefore, as illustrated in FIGS. 5 and 6, in both the direction of rotation for forward movement and the direction of rotation for backward movement, the outer-circumference trajectories 310A, 310B drawn by the belt 30 on the respective entry sides of the secondary pulley 20 are moved radially outside the secondary pulley 20, compared with the outer-circumference trajectory 310 in a no-loaded state. As a result, in a loaded state, on the entry side of the secondary pulley 20, an amount that the belt 30 projects radially outside from the outer circumference portion 20a (amount of projection of the belt) becomes larger than that in a no-loaded state. Furthermore, in a loaded state, an amount of projection of the belt on the entry side of the secondary pulley 20 is larger than an amount of projection of the belt on the exit side of the secondary pulley 20. Therefore, the radial distance L2 between the outer circumference portion 20a and the second internal surface 412 in the second direction is set to a radial distance based on the amount of projection of the belt on the entry side of the secondary pulley 20 in a loaded state and at the maximum gear ratio γ max. For example, the radial distance L2 in the second direction is set to a value obtained by adding a predetermined distance to the amount of projection of the belt on the entry side of the secondary pulley 20 described above.

Thus, in the portion where the belt 30 is wound along the secondary pulley 20 (circumferential range), an amount of projection of the belt 30 becomes relatively large in the vicinity of the belt entry side and, when the position of the secondary pulley 20 changes in a circumferential direction from the belt entry side toward the belt exit side, an amount of projection of the belt 30 changes so as to gradually decrease. In this case, in the vicinity of the exit side of the secondary pulley 20, the belt 30 may be in a position where the belt 30 does not project radially outside from the outer circumference portion 20a even in a loaded state and at the maximum gear ratio γ max. That is, in the secondary pulley 20, an amount of projection of the belt in the intermediate portion between the entry side and the exit side is smaller than an amount of projection of the belt near the entry side. The intermediate portion is a portion corresponding to the middle of the biting angle of the belt 30 in the secondary pulley 20 and is located on a straight line passing through the rotation center of the primary pulley 10 and the rotation center of the secondary pulley 20 as viewed from the axial direction (on a straight line along the first direction). When the direction of rotation of the secondary pulley 20 is reversed, the positional relationship between the belt entry side and the belt exit side is reversed, and thus the trajectory drawn by the belt 30 is also reversed.

Figure 7:
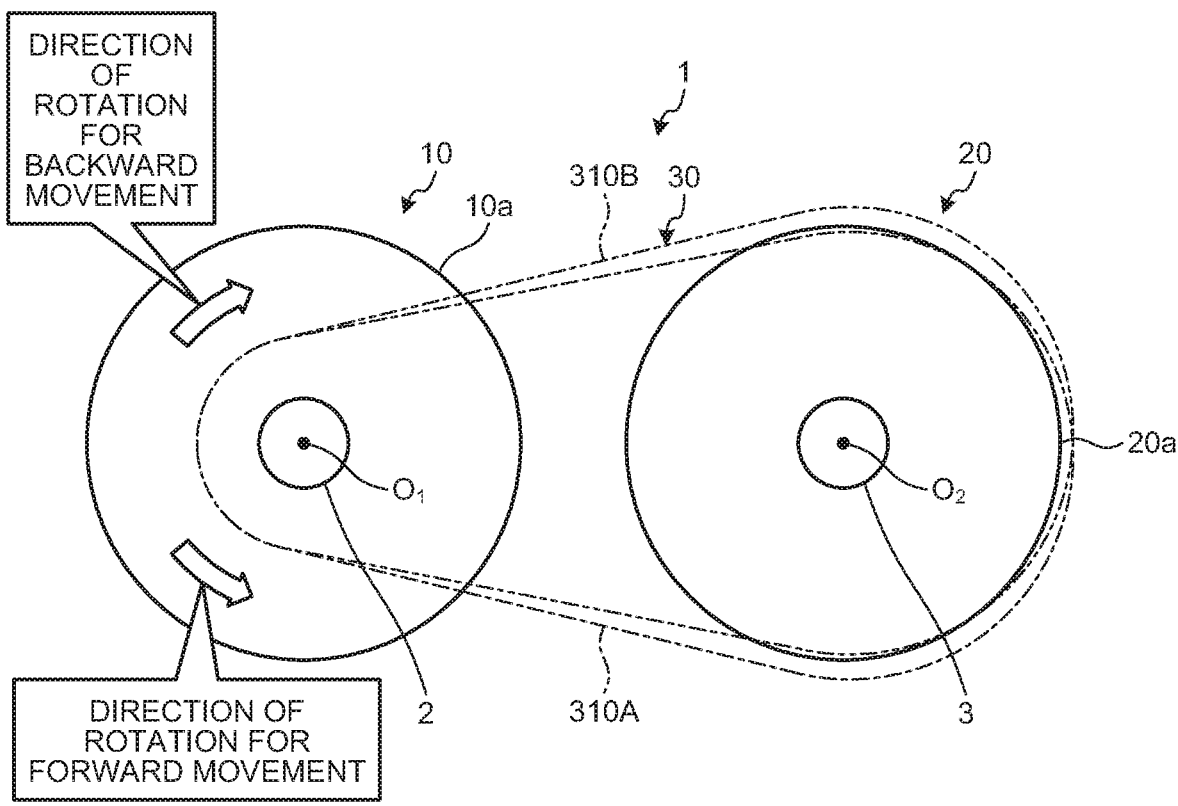
FIG. 7 is a schematic view illustrating the outer-circumference trajectory of the belt illustrated in FIG. 5 and the outer-circumference trajectory of the belt illustrated in FIG. 6, which are superposed.

As illustrated in FIG. 7, if the outer-circumference trajectory 310A for forward movement illustrated in FIG. 5 and the outer-circumference trajectory 310B for backward movement illustrated in FIG. 6 are superposed, each of the trajectories drawn by a radially outside end 31 of the belt 30 is further radially outside than the outer circumference portion 20a and has a non-perfect circular shape squeezed with respect to the perfect circular shape of the outer circumference portion 20a. That is, of the outer-circumference trajectories 310A, 310B drawn by a radially outside end 31, the trajectory located further radially outside has a non-perfect circular shape with respect to the outer circumference portion 20a of the secondary pulley 20. Therefore, taking a reverse direction of rotation of the secondary pulley 20 into consideration, the second internal surface 412 is formed in a shape that follows the outer-circumference trajectory drawn by a radially outside end 31 of the belt 30.

Figure 8:
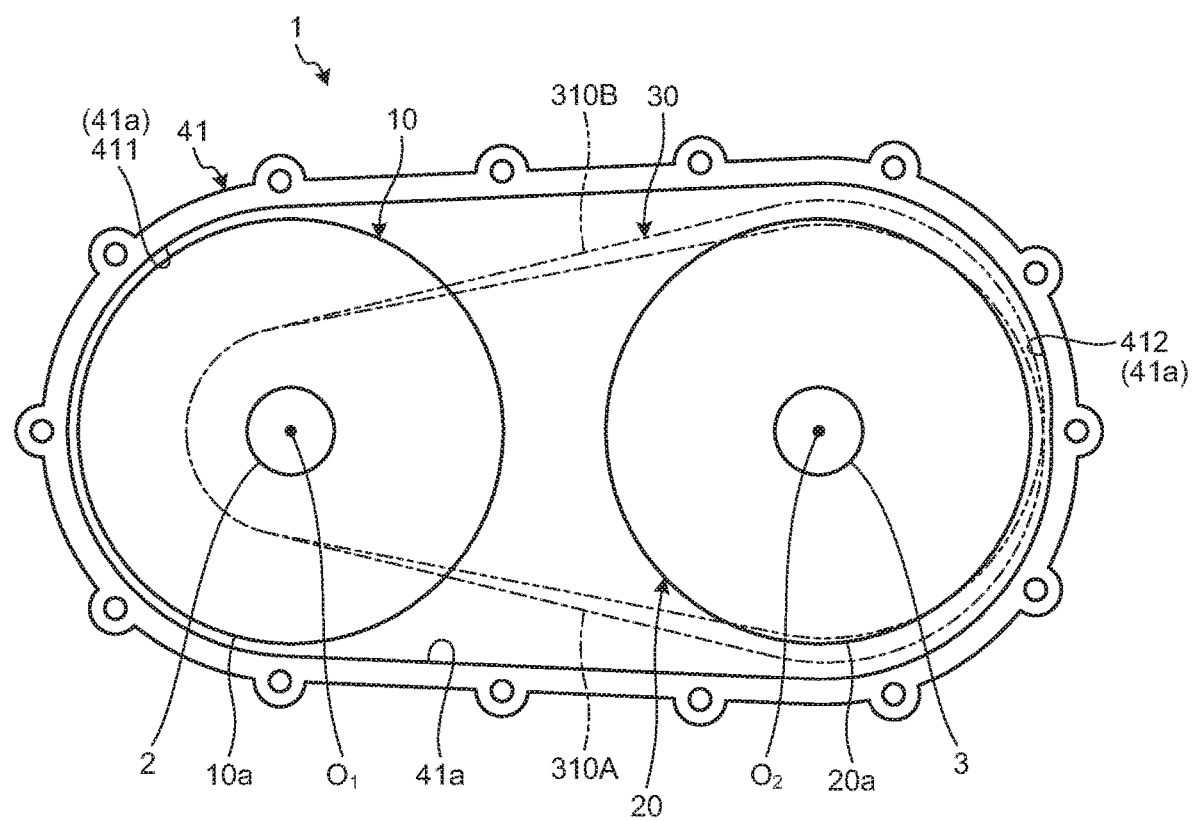
FIG. 8 is a schematic diagram for explaining the positional relationship between the outer-circumference trajectory of the belt illustrated in FIG. 7 and the internal surface of the casing.

FIG. 8 is a diagram for explaining the positional relationship between the outer-circumference trajectory of the belt illustrated in FIG. 7 and the internal surface of the casing member. As illustrated in FIG. 8, the second internal surface 412 formed on the secondary pulley 20 side is formed in a shape that follows the outer-circumference trajectories 310A, 310B drawn by a radially outside end 31 at the maximum gear ratio γ max. That is, on a plane orthogonal to the rotation center axis of the secondary pulley 20, the second internal surface 412 has a shape that follows a trajectory formed by overlapping the outer-circumference trajectory 310A drawn on the secondary pulley 20 side during forward movement, and the outer-circumference trajectory 310B drawn on the secondary pulley 20 side during backward movement. In other words, the second internal surface 412 is formed so as to follow the relatively radially outside trajectories of the outer-circumference trajectories 310A, 310B if the maximum gear ratio γ max is set. Therefore, the second internal surface 412 can be formed such that the radial distances between the outer-circumference trajectories 310A, 310B and the second internal surface 412 are equal.

As described above, in the embodiment, the radial distance from the rotation center of the secondary pulley 20 to the second internal surface 412 is set such that the distance in the first direction is shorter than the distance in the second direction. Therefore, taking the outer-circumference trajectories 310A, 310B of the belt 30 into consideration, the second internal surface 412 can be disposed near the outer circumference portion 20a of the secondary pulley 20, in the configuration in which a radially outside end 31 of the belt 30 can be located further radially outside than the outer circumference portion 20a of the secondary pulley 20 if the maximum gear ratio γ max is set. In addition, the second internal surface 412 of the casing member 41 is formed in a shape that follows the trajectory drawn by a radially outside end 31 of the belt 30. As a result, an extra radial gap is prevented from being provided between a radially outside end 31 of the belt 30 and the second internal surface 412 of the casing member 41. This makes it possible to prevent an increase in the size of the casing 4 while the internal surface 41a of the casing member 41 is located in a position where the internal surface is not in contact with a radially outside end 31 of the belt 30.

Figure 9:
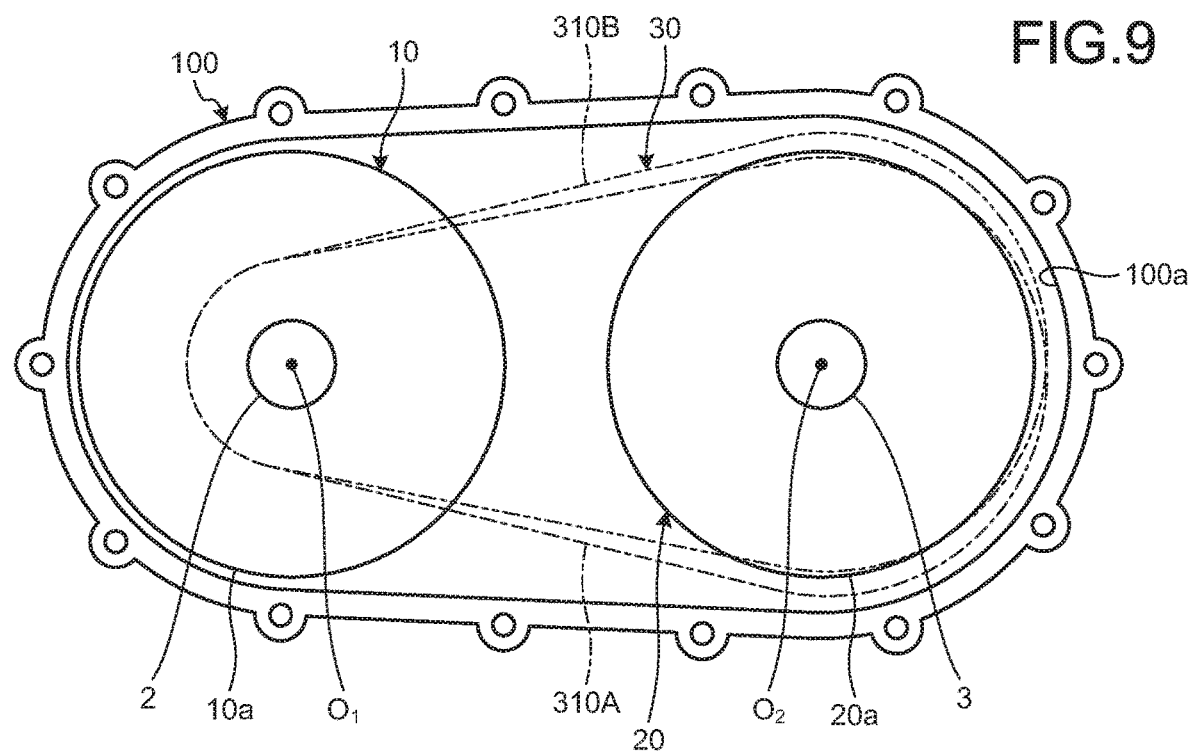
FIG. 9 is a schematic diagram illustrating a casing of a comparative example.
Figure 10:
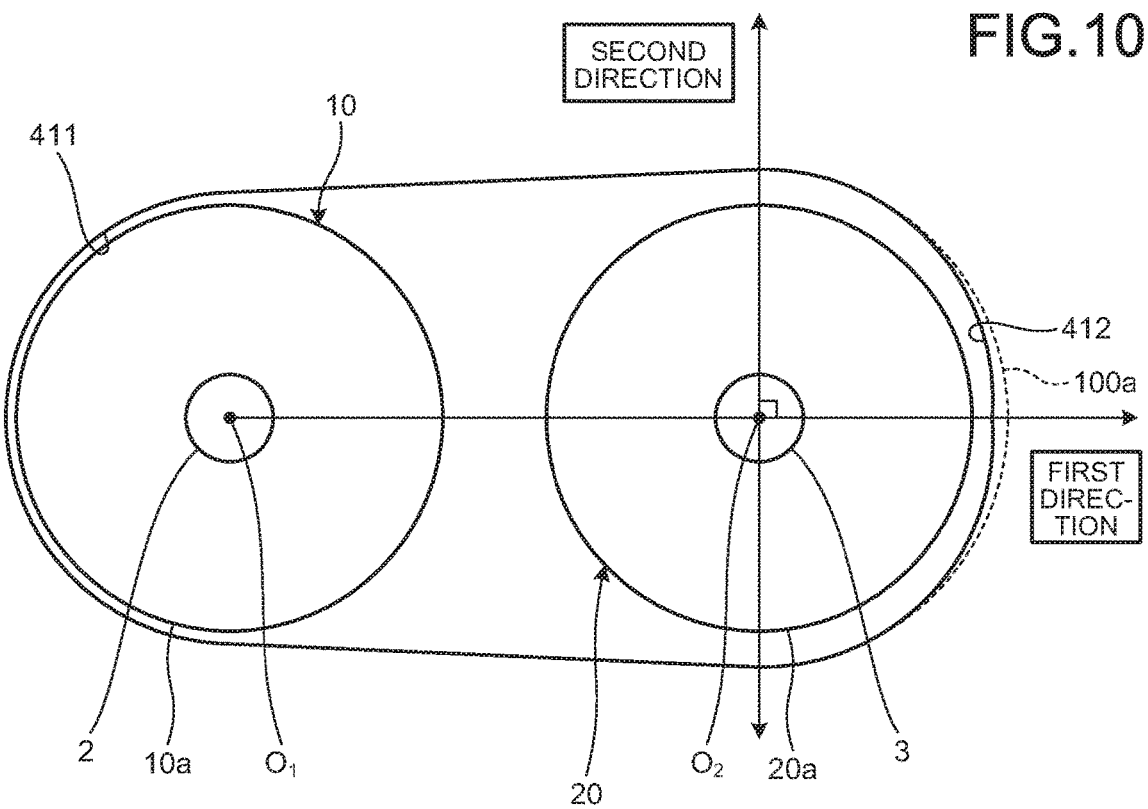
FIG. 10 is an explanatory diagram for comparing the internal surface shapes of the internal surface of the casing of the comparative example illustrated in FIG. 9 and the internal surface of the casing of the embodiment.

For example, in a casing member 100 of a comparative example illustrated in FIG. 9, an internal surface 100a of a portion covering an outer circumference portion 20a of a secondary pulley 20 is formed in a perfect circular shape that follows the outer circumference portion 20a. The casing member 41 of the above-described embodiment can be made smaller than the casing member 100 of the comparative example. Comparing the internal surface 100a of the comparative example illustrated in FIG. 9 and the second internal surface 412 of the embodiment, it can be seen that the second internal surface 412 is located in a radial position closer to the outer circumference portion 20a than the internal surface 100a of the comparative example, as illustrated in FIG. 10. As described above, according to the embodiment, the casing member 41 can be reduced in size.

In the present disclosure, the radial distance from the rotation center of the secondary pulley to the internal surface of the casing is set such that the radial distance in the first direction is shorter than the radial distance in the second direction. Thereby, of the casing of a portion covering the outer circumference portion of the secondary pulley, a portion corresponding to the first direction can be disposed in a radial position closer to the outer circumference portion of the secondary pulley than a portion corresponding to the second direction. Accordingly, an increase in the size of the casing can be prevented while the internal surface of the casing is located in a position where the internal surface is not in contact with a radially outside end of the belt.

According to an embodiment, of the casing of a portion covering the outer circumference portion of the secondary pulley, a portion corresponding to the first direction can be disposed in a radial position closer to the outer circumference portion of the secondary pulley than a portion corresponding to the second direction. This makes it possible to prevent an increase in the size of the casing while the internal surface of the casing is located in a position where the internal surface is not in contact with a radially outside end of the belt.

According to an embodiment, since the internal surface of the casing, on the outer-circumference side of the secondary pulley, is formed in a line-symmetrical shape with respect to the straight line passing through the rotation center of each pulley, the shape of the internal surface of the casing can be prevented from being made complicated.

According to an embodiment, on the outer-circumference side of the secondary pulley, since the internal surface of the casing is formed in the elliptic shape, the shape of the internal surface of the casing can be prevented from being made complicated.

According to an embodiment, since the internal surface of the casing is formed in a shape that follows a radial end portion of the belt, an extra radial gap is prevented from being provided between the radial end portion of the belt and the internal surface of the casing.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt-type continuously variable transmission comprising:
    a primary pulley;
    a secondary pulley;
    a belt wound along the primary pulley and the secondary pulley; and
    a casing accommodating the primary pulley and the secondary pulley, wherein
        the belt has, in a portion being wound along the secondary pulley, a radially outside end which may be located further radially outside than an outer circumference portion of the secondary pulley,
        a distance from a rotation center of the secondary pulley to an internal surface of the casing in a first direction, which is along a straight line passing through a rotation center of the primary pulley and the rotation center of the secondary pulley, is shorter than a distance from the rotation center of the secondary pulley to the internal surface of the casing in a second direction which is orthogonal to the first direction at the rotation center of the secondary pulley, and
        in a portion covering the outer circumference portion of the secondary pulley, the internal surface is formed in a line-symmetrical shape with respect to a straight line passing through the rotation center of the primary pulley and the rotation center of the secondary pulley, on a plane orthogonal to a rotation center axis of the secondary pulley.

2. A belt-type continuously variable transmission comprising:
    a primary pulley;
    a secondary pulley;
    a belt wound along the primary pulley and the secondary pulley; and
    a casing accommodating the primary pulley and the secondary pulley, wherein
        the belt has, in a portion being wound along the secondary pulley, a radially outside end which may be located further radially outside than an outer circumference portion of the secondary pulley,
        a distance from a rotation center of the secondary pulley to an internal surface of the casing in a first direction, which is along a straight line passing through a rotation center of the primary pulley and the rotation center of the secondary pulley, is shorter than a distance from the rotation center of the secondary pulley to the internal surface of the casing in a second direction which is orthogonal to the first direction at the rotation center of the secondary pulley, and
        in the portion covering the outer circumference portion of the secondary pulley, the internal surface is formed in an elliptic shape, on the plane orthogonal to a rotation center axis of the secondary pulley.

3. A belt-type continuously variable transmission comprising:
    a primary pulley;
    a secondary pulley;
    a belt wound along the primary pulley and the secondary pulley; and
    a casing accommodating the primary pulley and the secondary pulley, wherein
        the belt has, in a portion being wound along the secondary pulley, a radially outside end which may be located further radially outside than an outer circumference portion of the secondary pulley, a distance from a rotation center of the secondary pulley to an internal surface of the casing in a first direction, which is along a straight line passing through a rotation center of the primary pulley and the rotation center of the secondary pulley, is shorter than a distance from the rotation center of the secondary pulley to the internal surface of the casing in a second direction which is orthogonal to the first direction at the rotation center of the secondary pulley, and in the portion covering the outer circumference portion of the secondary pulley, the internal surface is formed in a shape that follows a trajectory drawn by the radially outside end of the belt further radially outside than the outer circumference portion of the secondary pulley during rotation of the secondary pulley.

* * * * *